E. L. GOLTRY.
SPRING WHEEL.
APPLICATION FILED FEB. 3, 1912.

1,046,289.

Patented Dec. 3, 1912.

2 SHEETS—SHEET 1.

WITNESSES

INVENTOR
Edwin L. Goltry,
BY Munn & Co.
ATTORNEYS

E. L. GOLTRY.
SPRING WHEEL.
APPLICATION FILED FEB. 3, 1912.
1,046,289.
Patented Dec. 3, 1912.
2 SHEETS—SHEET 2.
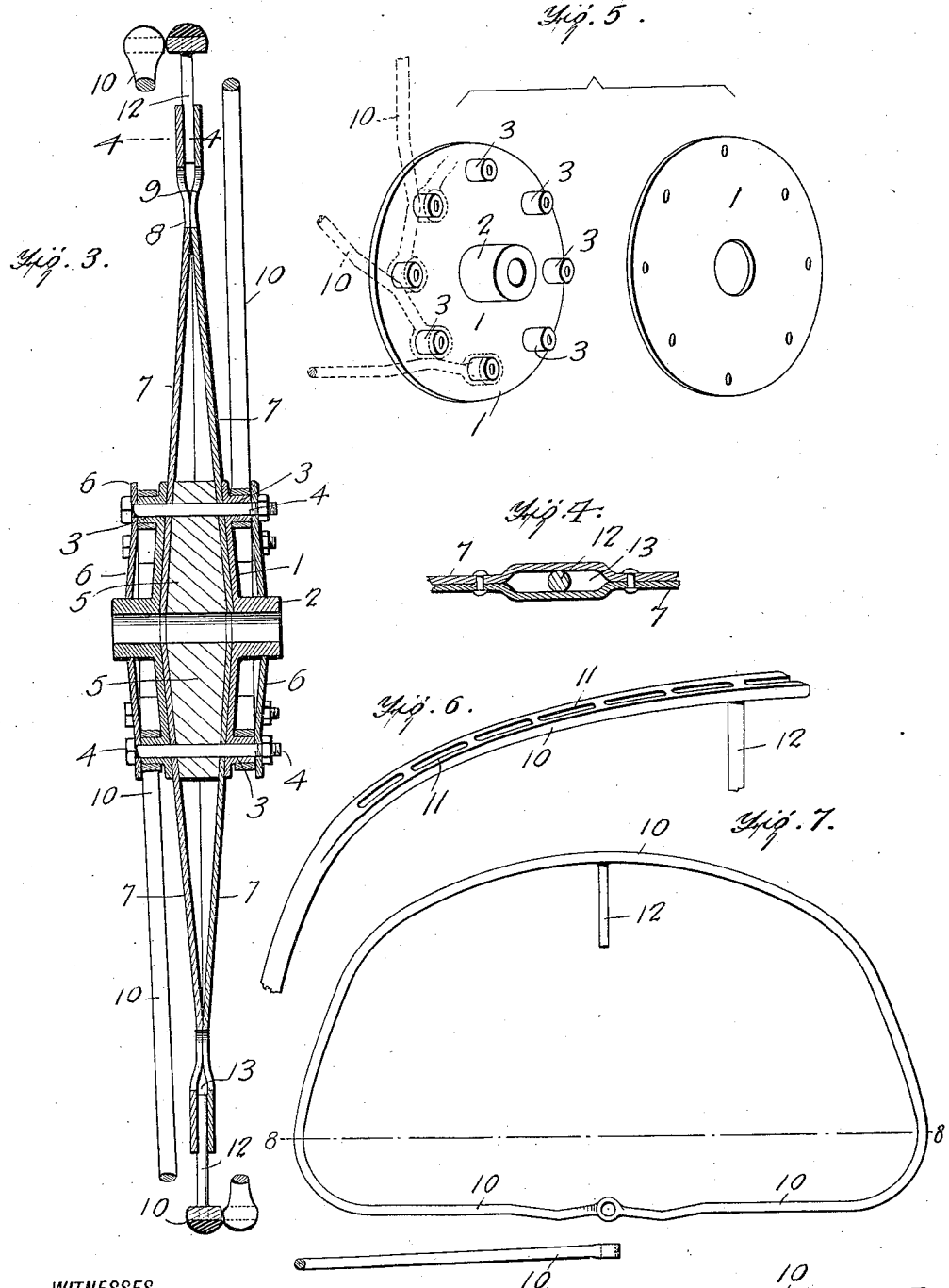
WITNESSES
L. H. Schmidt
Amos W. Hart
INVENTOR
EDWIN L. GOLTRY,
BY Munn & Co.
ATTORNEYS

UNITED STATES PATENT OFFICE.

EDWIN LEWIS GOLTRY, OF RED OAK, IOWA.

SPRING-WHEEL.

1,046,289.　　　　　Specification of Letters Patent.　　Patented Dec. 3, 1912.

Application filed February 3, 1912. Serial No. 675,113.

*To all whom it may concern:*

Be it known that I, EDWIN L. GOLTRY, a citizen of the United States, and a resident of Red Oak, in the county of Montgomery and State of Iowa, have invented an Improvement in Spring-Wheels, of which the following is a specification.

My invention is an improvement in the class of wheels which are provided with an elastic tire or tread formed of spring metal parts or members and intended as a substitute for the expensive pneumatic or solid rubber tires usually employed on the wheels of automobiles and other motor-driven vehicles.

I have devised a tire or tread which is adapted to meet all requirements; that is to say, it possesses due elasticity, moderate lightness, and great strength and durability, besides having other minor qualities that commend it for general use. In addition to the tire proper, I have also devised a special construction of the body of the wheel to which the tire members or sections are detachably secured.

Figure 1:
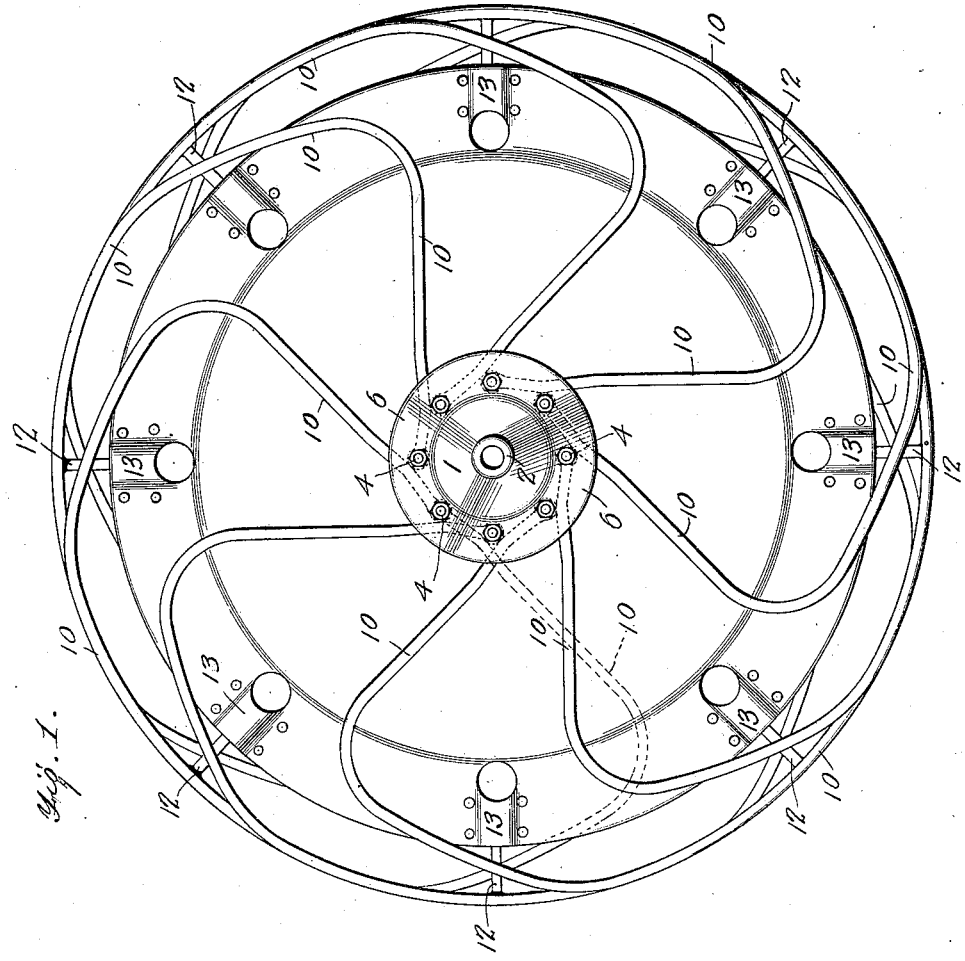
Figure 2:
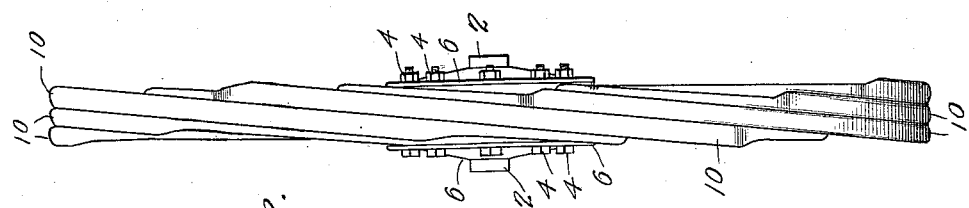

In the accompanying drawings, Figure 1 is a side view of my improved wheel. Fig. 2 is an edge view. Fig. 3 is a central diametrical cross section of the same. Fig. 4 is a horizontal section on the line 4—4 of Fig. 3. Fig. 5 is a perspective view of the two hub sections detached from each other. Fig. 6 is a perspective view of the outer or tread portion of a tire rod or section. Fig. 7 is a side view of such rod or section. Fig. 8 is a horizontal section on the line 8—8 of Fig. 7.

The hub of the wheel is formed of two duplicate, circular, disk-like parts or sections 1 having perforated central bosses 2 which are suitably constructed to form a bearing for the wheel axle (not shown). The disks 1 are further provided with a series of smaller bosses 3, adjacent to the periphery, through which bolts 4 pass. A circular block 5 is arranged in the center of the hub and provided with a bore coincident with that extending through the central bosses 2. Thin disks 6 are applied on the outer side of the hub and secured to the bosses 3 by means of the bolts 4, as shown in Fig. 3. These parts constitute the hub proper.

The body of the wheel is formed of two duplicate concavo-convex plates 7 which may, for convenience, be termed disks. As shown in Fig. 3, the concave sides of the disks are opposed, being separated by the interposed block 5, and their outer or rim portions are in contact at 8 and provided with transverse openings 9.

The elastic tire of the wheel is formed of a series of spring rods or bars 10 which are in bowed form, as shown in Fig. 7, being approximately semicircular, the outer or tread portion being convex and provided, as shown in Fig. 6, with a series of longitudinal slots 11 which provide a good seat for a rubber tire covering that may be applied thereto when desired.

As will be understood by reference to Fig. 2, the tire members or sections 10 are slightly twisted, that is to say, their ends are separated laterally, as shown in Fig. 8, so that the rods may be applied to a wheel body in such manner as to cross the plane of the wheel at a slight angle, as represented in Figs. 1 and 2. The ends of the tire rods or sections 10 are constructed with enlarged eyes which adapt them to be applied to the small bosses 3 with which the hub disks 1 are provided. Thus one end of each spring rod 10 is secured on one side of the hub and the other end is secured on the opposite side. The shanks of each spoke preferably bear upon the adjacent bosses as in Figs. 1 and 5.

It will be seen by inspection of Fig. 2 that the bowed or convex outer portions of the tire rods lie in close contact, which is the preferred arrangement. The rods have a good degree of resiliency and hence yield to pressure so that their convex middle portions flatten more or less upon the imposition of a load, and proportionately to such load. The inclined or angular position of the rods enables them to withstand a good degree of lateral pressure or torsion, but as an aid in this matter I provide the central portion of each rod with a spoke attachment. as indicated at 12 in Figs. 1 and 3. These false or short spokes 12 enter sockets 13 formed in the rim of the body of the wheel and are adapted to slide radially therein and also in the plane of the wheel. In other words, the spokes have a certain degree of play, or endwise and lateral movement, in the slots 13, but resist any torsional strain or stress applied at right angles to the plane of the wheel.

It is apparent that the breadth or width of the tread may be increased by increasing the number of the spring members or rods 10, in which case it would only be necessary to provide the hub disks 1 with a greater number of small bosses 3 for attachment of the rods.

It will be seen that I thus produce a metallic wheel having a light but strong, rigid body and an elastic punctureless tire or tread which may be used successfully as a substitute for the ordinary pneumatic and solid rubber tires in general use.

What I claim is:—

In a spring wheel of the type indicated, the combination with the body formed of concavo-convex disks whose concave sides are approximated, duplicate hub sections having a series of lateral perforated bosses, bolts passing through the bosses and the disks, and an elastic tread formed of spring rods which are in bowed form, their ends being secured to coincident bosses on opposite sides of the wheel, and their convex middle portions extending across the periphery of the body portion and at a slight angle to the plane of the wheel, substantially as described.

EDWIN LEWIS GOLTRY.

Witnesses:
WM. T. REYNOLDS,
W. H. THOMAS.

---

Copies of this patent may be obtained for five cents each, by addressing the "Commissioner of Patents, Washington, D. C."